G. G. BATES.
HAY RACK.
APPLICATION FILED MAY 6, 1913.
1,098,658.
Patented June 2, 1914.
3 SHEETS—SHEET 3.
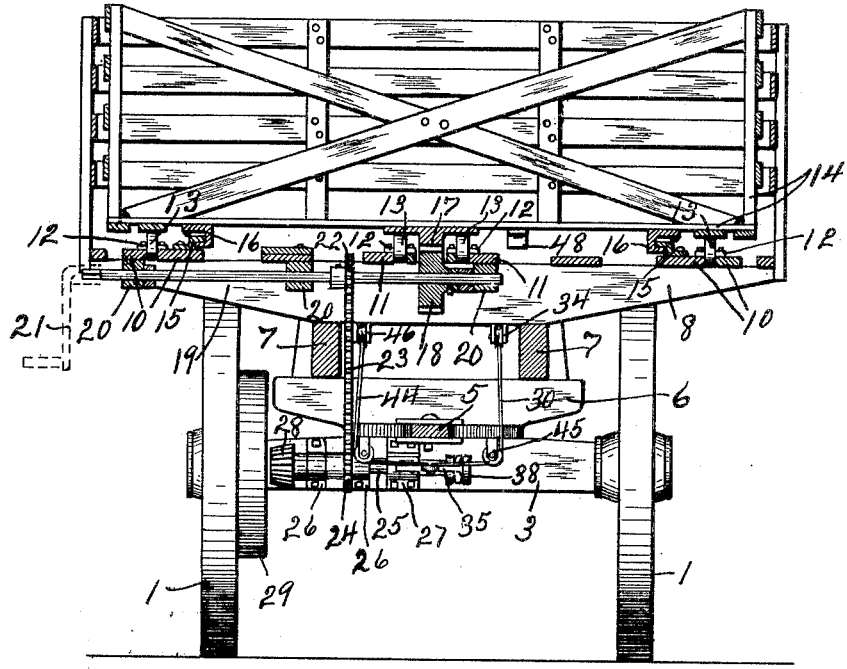
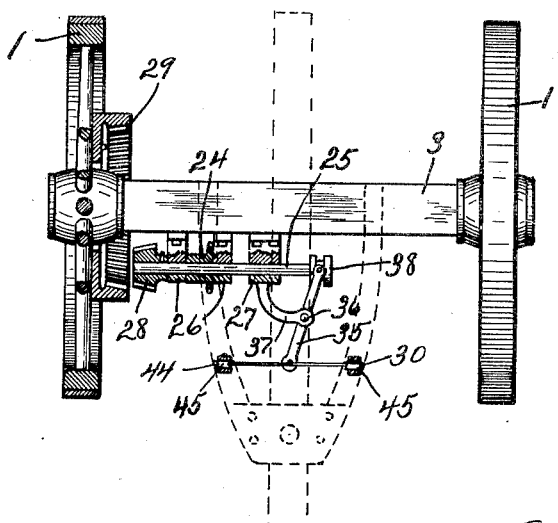
WITNESSES:
INVENTOR.
G. G. Bates
BY
Howard P. Denslow
ATTORNEY.

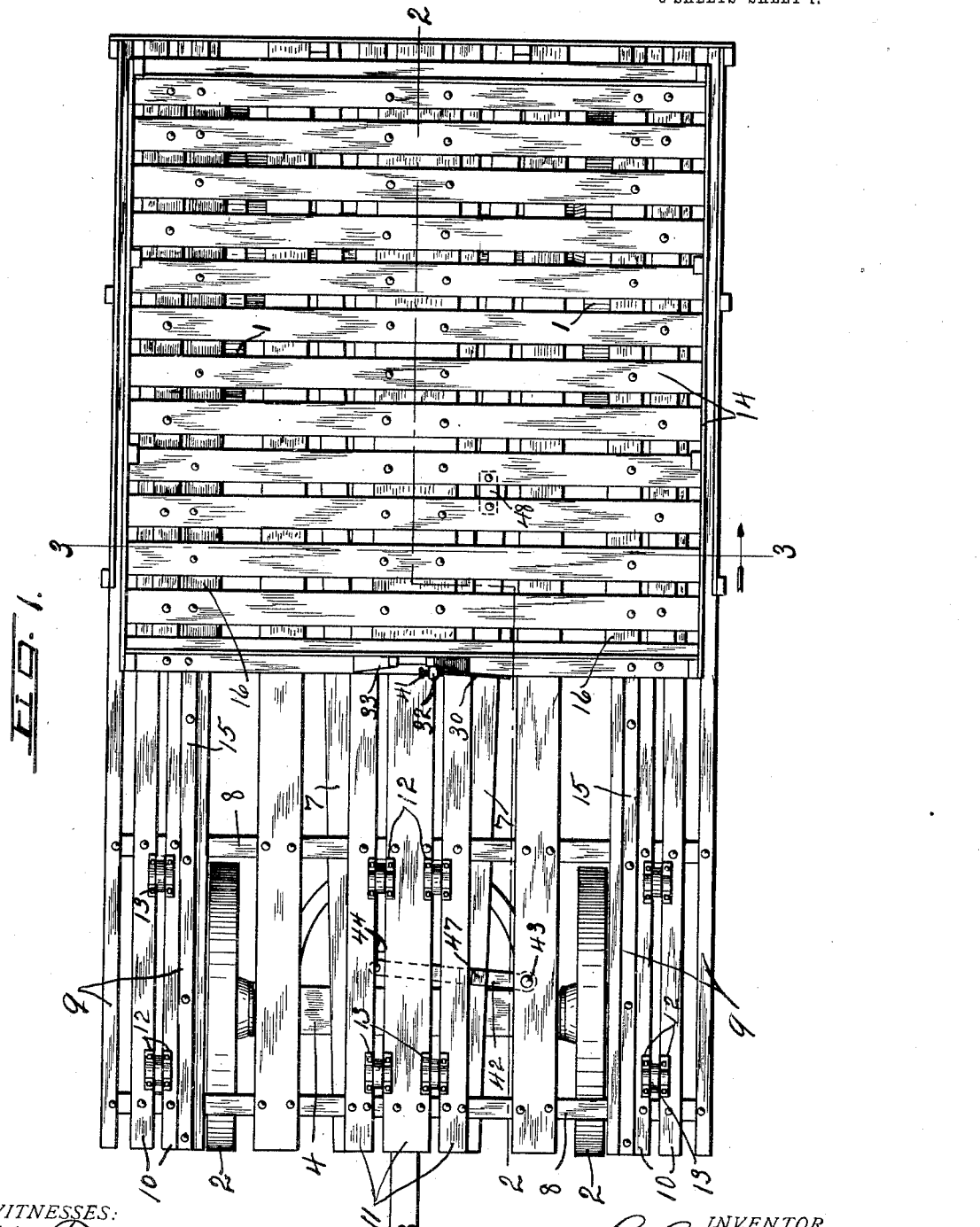

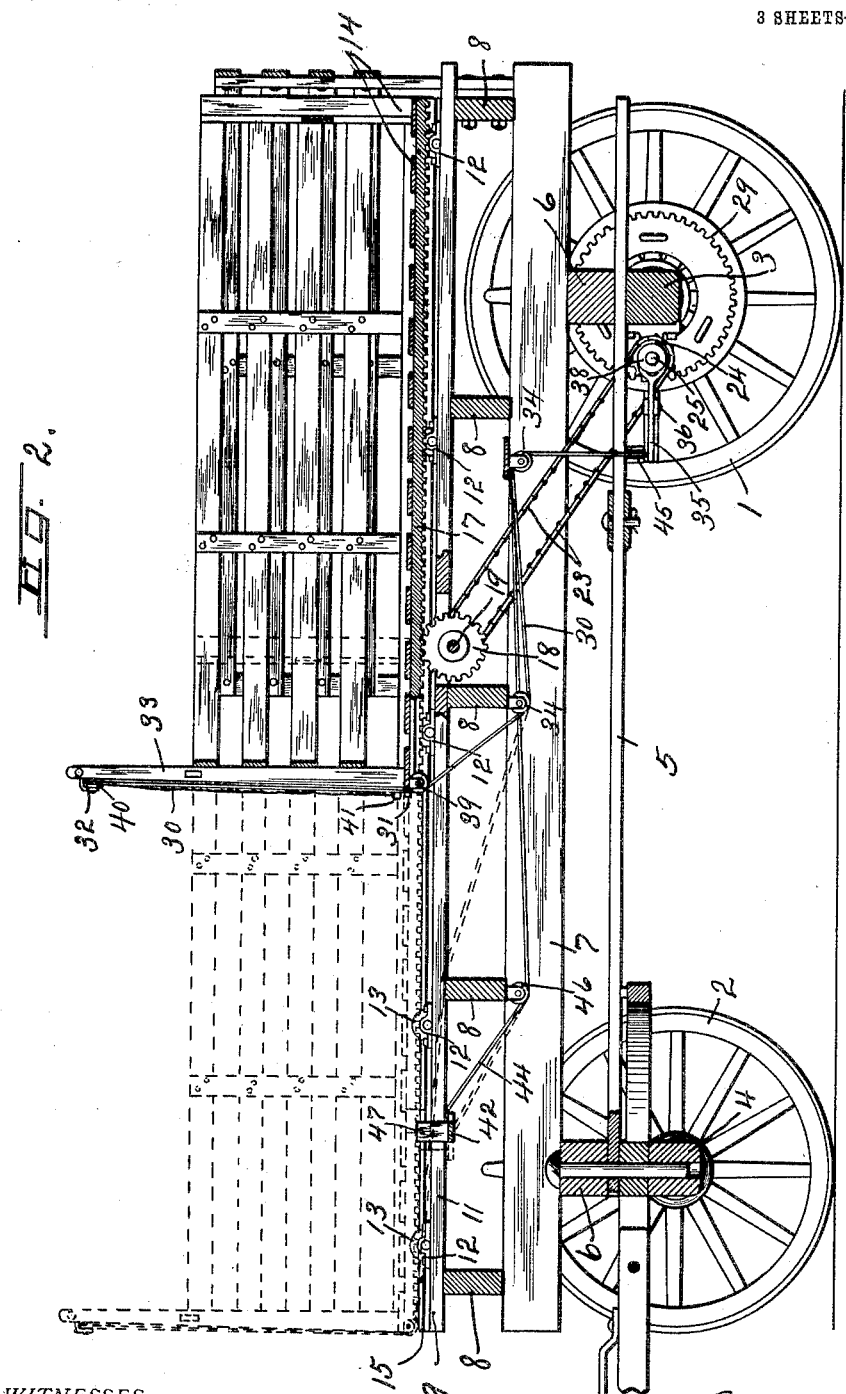

UNITED STATES PATENT OFFICE.

GEORGE G. BATES, OF SYRACUSE, NEW YORK.

HAY-RACK.

1,098,658. Specification of Letters Patent. Patented June 2, 1914.

Application filed May 6, 1913. Serial No. 765,791.

*To all whom it may concern:*

Be it known that I, GEORGE G. BATES, of Syracuse, in the county of Onondaga, in the State of New York, have invented new and useful Improvements in Hay-Racks, of which the following, taken in connection with the accompanying drawings, is a full, clear, and exact description.

This invention relates to certain improvements in hay wagons, commonly known as hay racks, adapted to be used in connection with mechanical hay-loaders, and comprising a four-wheel truck having a relatively stationary platform or main rack and a forwardly and rearwardly movable rack or section supported and guided upon the platform and normally positioned at the rear thereof for receiving the initial half of a load prior to being drawn forwardly to the front end of the platform to permit the other half of a load to be deposited upon the rear end of the main rack or platform.

My improvement has to do more particularly with the means for shifting the movable rack forwardly and rearwardly, and also to the means for automatically disconnecting it from its actuating means when approaching the limit of its forward movement.

The main object is to provide simple means, including a rack and pinion driven from one of the wheels of the truck, for moving the loaded hay rack section forwardly to the front end of the truck as the latter is propelled along the ground.

Another object is to provide means actuated by the forwardly moving section, when it reaches a predetermined position, for throwing the pinion out of mesh with its toothed rack and thereby stopping the further forward movement of said section, even though the truck may continue to move forwardly, thereby leaving the entire vehicle free to be propelled in either direction without affecting the position of the movable section.

A further object is to provide the movable section and platform upon which it is mounted with sliding, interlocking connections constituting guides or ways for holding the movable rack against lateral or upward movement relatively to said platform.

Other objects and uses will be brought out in the following description.

In the drawings Figure 1 is a top plan of a hay rack embodying the various features of my invention. Fig. 2 is a longitudinal vertical sectional view of the same hay rack, taken on line 2—2 of Fig. 1. Fig. 3 is a transverse vertical sectional view taken on line 3—3 of Fig. 1. Fig. 4 is a horizontal sectional view of the driving gear on one of the rear wheels, together with the pinion and a portion of its shifting mechanism for throwing it into and out of mesh with said gear, the rear axle and opposite wheel being shown in elevation.

In order that my invention may be clearly understood, I have shown a four-wheel truck comprising the rear wheels, —1—, and front steering wheels —2—, together with their respective axles —3— and —4— and reach —5—, said axles being also provided with bolsters —6— carrying a main frame —7— upon which is mounted a series of cross bars —8— for supporting the main rack or platform —9— in a horizontal plane some distance above that of the upper sides of the wheels, thereby permitting the use of a rack of considerably greater width than the transverse distance between the wheels and also permitting said wheels to turn freely without liability of friction with the under side of the rack.

The platform —9— is provided with outer and inner sets of lengthwise parallel slats or bars —10— and —11— secured to the cross bars —8— and extending between and some distance beyond the vertical planes of the bolsters —6— for receiving and supporting corresponding sets of roller bearings —12—, in which are journaled antifriction rollers —13— for receiving and supporting a superposed movable hay rack or section —14—. One of each of the outer sets of lengthwise slats or bars —10— are also used to support lengthwise guide flanges or ways —15— with which are slidably interlocked corresponding guide flanges —16— on the under side of the movable hay rack or section —14— for holding the latter against lateral or upward displacement as the vehicle is drawn over more or less rough ground or pavements, and also serving to hold the rack and pinion, presently described, constituting a part of the carriage actuating means, in mesh with each other.

Centrally secured to the under side of the movable rack or section —14—, which may be hereafter termed the carriage, is a longitudinally extending toothed rack —17— meshing with a rotary pinion —18—, the latter being secured to one end of a transversely extending shaft —19—, which is journaled in suitable bearings —20— on the platform —9— and adapted to be rotated by a hand crank —21— or by suitable mechanism, presently described, driven from one of the rear wheels of the truck. For this latter purpose, the shaft —19— is provided with a sprocket wheel —22— connected by a chain —23— to a corresponding sprocket wheel —24—, which is feathered or splined upon a transversely extending and axially movable countershaft —25—, as shown more clearly in Figs. 3 and 4. This countershaft is mounted in suitable bearings —26— and —27— on the front side of the rear axle —3— and is provided with a pinion —28— rigid thereon and movable therewith into and out of mesh with an internal gear —29—, which is secured to one of the rear wheels —1— coaxial therewith so that when the vehicle is being propelled and the pinion —28— is in mesh with the gear —29— the carriage —14— will be moved longitudinally along the platform in one direction through the medium of the sprocket chain —23— and rack and pinion —17— and —18—.

When it is desired to load the hay rack by the mechanical hay loader, not shown, the empty section or carriage —14— is moved by hand or otherwise to its extreme rearward position on the rear end of the platform —9—, as shown in Figs. 1 and 2, where it is filled with hay and then drawn forwardly by suitable mechanism actuated by the forward movement of the wagon until it reaches its extreme limit of forward movement on the front end of the platform, thus permitting the balance of the load to be deposited on the rear end of the main rack.

When the carriage —14— is in its extreme rearward position, as shown in Figs. 1 and 2, the clutch or pinion —28— is out of action or out of mesh with the internal gear —29—, but when the carriage is filled with hay and it is desired to draw it forwardly, the clutch or pinion —28— is thrown into mesh with the gear —29— and the vehicle propelled forward, thereby transmitting motion to the carriage until it reaches the limit of its forward movement. This throwing of the clutch or pinion —28— into mesh with the gear —29— is preferably done voluntarily by means of a cable —30— having one end passed through suitable guides —31— and —32— on an upright standard —33— on the front of the carriage —14—, as shown more clearly in Figs. 1 and 2, the opposite end of said cable being extended rearwardly under the carriage around sheaves —34— and connected to one end of a shifting lever —35— for sliding the shaft —25— endwise. This shifting lever —35— is pivoted at —36— to a stationary arm —37— on the bearing —27— and has its rear end engaged in a grooved collar —38— which permits the rotation of the shaft and at the same time enables it to be moved endwise in either direction by the movement of the lever —35— in a corresponding direction.

The front portion of the cable —30— is passed around a sheave —39— on the front of the bottom of the carriage —14—, while its upper end is passed around a similar sheave —40— forming a part of the guide —32— and is provided with a ring or hand piece —41— by which the cable may be drawn upwardly for shifting the rear end of the lever —35— to the left, Fig. 4, and thereby throwing the pinion —28— into mesh with the gear —29—. This operation establishes connection between the rear wheel —1— carrying the gear —29— and rack or carriage —14— so that when the truck is propelled forwardly the same motion will be transmitted to the carriage. This forward motion of the carriage is utilized to actuate a suitable tripping mechanism whereby the lever —35— is moved in the opposite direction from that imparted to it by the cable —30—, previously described, for withdrawing the pinion —28— from engagement with the gear —29— when the carriage approaches the limit of its forward movement. For this purpose a shifting lever —42— is pivoted at one end at —43— to the under side of the platform —9— and extends laterally under said platform some distance beyond the longitudinal center thereof, where it is connected by a cable —44— to the same end of the lever —35— as the cable —30—. These cables, although attached to the same point of the lever —35—, extend in opposite directions therefrom around sheaves —45—, the cable —44— being then extended forwardly around a sheave —46— and connected to the free end of the lever —42—, as previously stated it being understood that the end of the cable between the ring —41— and guide —32— is of sufficient length to permit the carriage —14— to be moved to its extreme forward position without straining the cable which readily renders around the sheaves —40—, —39— and —34— as the carriage is being drawn forwardly after the clutch pinion —28—has been thrown into engagement with the gear —29— by the manual operation of said cable. The intermediate portion of this lever —42—is provided with a raised projection or abutment —47— projecting upwardly between adjacent slats of the platform into the path of a coöperative pendant projection or abutment —48— on the under side of the carriage —14— a short distance to the rear of the front end thereof and positioned so as to contact with the abutment —47— for tripping the lever —42— and thereby disengaging the pinion —28— from the gear —29—just as the carriage reaches the limit of its forward movement, or about the time that its front end is alined vertically with the corresponding end of the platform.

By automatically tripping the lever —42— in the manner just described, it is evident that the forward movement of the carriage will be stopped at the proper time, thereby breaking the connection between the carriage and rear wheel of the truck and permitting said truck to be propelled in either direction without disturbing the position of the carriage.

After the hay rack is completely filled and the truck is drawn to its destination and returned for another load, the cable —30— may be again operated by means of the ring —41— or by pulling up on any portion of the cable to throw the clutch or gear —28— into operative connection with the traction wheel ready for a repetition of the operation just described. It is evident, however, that while the clutch or gear —28— is in its inoperative position the empty carriage —14— may be moved backward and forward by hand, and while I have shown the cable —30— as extended forwardly and upwardly to the top of the standard —33— on the front of the carriage, it is evident that it may be otherwise positioned without departing from the spirit of my invention and, therefore, I do not limit myself to the exact details of structure and arrangement herein shown and described.

What I claim is:

1. A hay rack comprising a wheel truck, a platform mounted on the truck, rollers mounted on the platform at opposite sides of its longitudinal center, a transverse shaft journaled on said platform, a pinion on said shaft, means including a clutch for transmitting motion from one of the wheels to the shaft, a carriage having tracks on its underside resting on the rollers, a toothed rack secured to the underside of the carriage between the tracks and meshing with said pinion, a cable connected to the clutch for throwing it into action, a separate cable also connected to the clutch for throwing it out of action, and means operated by the forward movement of the carriage for operating the last named cable when said carriage approaches the limit of its forward movement.

2. In combination with a four-wheel truck having a relatively stationary platform, a horizontally disposed lever pivoted to the underside of the platform some distance to the rear of its front end, a carriage movable lengthwise of and upon the platform, a toothed rack secured to the underside of the longitudinal center of the carriage, a pinion journaled on the platform and meshing with the toothed rack, means including a clutch for transmitting motion from one of the truck wheels to the pinion, sheaves on the front end of the carriage, a cable passed around said sheaves and connected to said clutch for throwing it into action, a separate cable connected to the lever and to the clutch for throwing said clutch out of action, and a lever-operating member secured to the underside of the carriage for engaging and operating said lever as the carriage approaches the limit of its forward movement.

In witness whereof I have hereunto set my hand this 28th day of April 1913.

GEORGE G. BATES.

Witnesses:
H. E. CHASE,
VIOLA HOWLAND.

---

Copies of this patent may be obtained for five cents each, by addressing the "Commissioner of Patents, Washington, D. C."